US006217398B1

(12) United States Patent
Davis (10) Patent No.: US 6,217,398 B1
(45) Date of Patent: Apr. 17, 2001

(54) HUMAN-POWERED OR HUMAN-ASSISTED ENERGY GENERATION AND TRANSMISSION SYSTEM WITH ENERGY STORAGE MEANS AND IMPROVED EFFICIENCY

(75) Inventor: Donald L. Davis, Roscoe, IL (US)

(73) Assignee: Arrowswift, Inc., Roscoe, IL (US)

( * ) Notice: Subject to any disclaimer, the term of this patent is extended or adjusted under 35 U.S.C. 154(b) by 0 days.

(21) Appl. No.: 09/293,144

(22) Filed: Apr. 16, 1999

Related U.S. Application Data (60) Provisional application No. 60/082,137, filed on Apr. 17, 1998.

(51) Int. Cl.[7] .................................................. B63H 16/00

(52) U.S. Cl. ..................................... 440/21; 440/1; 440/2; 280/216

(58) Field of Search ................................. 440/21, 26, 27, 440/28, 29, 30, 31; 280/212, 215, 216; 474/50

(56) References Cited

U.S. PATENT DOCUMENTS

| 89,822 | 5/1869 | Wilmarth . |
| 190,353 | 5/1877 | Mitchell . |
| 445,452 | 1/1891 | Murray . |
| 448,952 | 3/1891 | Foster . |
| 693,956 | 2/1902 | Duquemin . |
| 784,345 | 3/1905 | Pepper . |
| 1,015,996 | 1/1912 | Corbitt . |

(List continued on next page.)

FOREIGN PATENT DOCUMENTS

| 0636536 | 2/1995 | (EP) | ............................ | B62M/23/02 |
| 2050270 | 1/1981 | (GB) | ............................ | B60K/11/00 |
| WO9632314 | 10/1996 | (WO) | ............................ | B62K/11/00 |

OTHER PUBLICATIONS

*Scientific American* magazine article entitled "Human–powered Flight", by Mark Drela and John S. Langford, Nov. 1985 issue, pp. 144–151.
*The Future Bike* magazine article entitled "Practical Vehicles", pp. 140–141.
*Automotive Engineering* magazine article entitled "Alternative energy storage", by Kevin Jost, Nov. 1996 issue, pp. 35–37.
*Design News* magazine article entitled "Flywheel design challenges batteries", by Brian J. Hogan, Aug. 11, 1997 issue, pp. 89–91.
*Harmonic Drive* magazine article entitled "Heavy–Duty Pancake Component Gear Sets", May 1990 issue.
Southwest Windpower advertisements for AIR marine, AIR wind module, and Windseeker.

Primary Examiner—Jesus D. Sotelo
(74) Attorney, Agent, or Firm—Leydig, Voit & Mayer, Ltd.

(57) ABSTRACT

Efficient human-powered or human-power assisted energy generation and transmission system adapted for use with vehicles. The present invention can be utilized to achieve overall energy transmission efficiency superior to mechanical drives that utilize chains and sprockets or other mechanical drive mechanisms. The present invention can completely eliminate the need for multiple sprockets and the associated shifting mechanisms presently used in most bicycles. By utilizing high efficiency, light weight, direct-drive generators and motors, and an input controller, coupled with an efficient energy storage device, the present invention can reduce the overall weight and complexities of mechanical power transmissions, while, at the same time, offer higher overall efficiencies. In addition, the energy output to the output drive device can be controlled, through profiling and with an output controller, to maintain constant output, independent of instantaneous input. Thus, in a human-powered vehicle, constant thrust can be maintained significantly increasing the vehicle efficiency, compared to the cyclical thrust or torque generated using a mechanical system.

19 Claims, 5 Drawing Sheets

U.S. PATENT DOCUMENTS

| | | | |
|---|---|---|---|
| 2,272,801 | 2/1942 | Hawrylasz | 280/212 |
| 2,965,393 | 12/1960 | Cauchon | 280/212 |
| 3,734,535 | 5/1973 | Sidlauskas | 280/215 |
| 4,290,621 | 9/1981 | Davey | 280/216 |
| 4,657,514 | 4/1987 | Chun | 440/31 |
| 4,711,195 | 12/1987 | Shutt | 114/274 |
| 5,035,678 | 7/1991 | Hageman | 474/50 |
| 5,489,002 | 2/1996 | Streiff | 180/65.3 |

HUMAN-POWERED OR HUMAN-ASSISTED ENERGY GENERATION AND TRANSMISSION SYSTEM WITH ENERGY STORAGE MEANS AND IMPROVED EFFICIENCY

CROSS-REFERENCE TO RELATED APPLICATION

This application claims the priority benefit under 35 U.S.C. §119(e) of U.S. patent application Ser. No. 60/082,137, filed on Apr. 17, 1998.

FIELD OF THE INVENTION

The present invention generally relates to human-powered energy generation and transmission, and more particularly relates to using human power as at least a partial contributor of power to a vehicle and to any other electrically actuated device.

BACKGROUND OF THE INVENTION

Vehicles which use human generated power have been around for centuries. The advantages of energy storage in these vehicles has been well known for over a century. For example, U.S. Pat. No. 89,882, issued to S. Wilmarth, dated May 4, 1869, discloses the use of a flywheel to improve the performance of a three-wheeled, human-powered velocipede. Likewise, U.S. Pat. No. 190,353, issued to W. S. Mitchell on May 1, 1877 discloses a spring as an alternative form of energy storage; again, to improve the performance of a velocipede.

The typical pedal mechanism used on most bicycles, using chains and sprockets, inputs power in a cyclical fashion, with maximum input only when the pedal is horizontal. In addition, the aforementioned pedal mechanism requires numerous different sprockets, changed via a shifting mechanism, to be able to change gears, depending on the terrain. People have understood the limitations of the typical pedaling system used on most bicycles for many years. Some have tried to make various elliptical sprockets to try to extend the portion of a rotation where the maximum power input is obtained; that is during the horizontal position of the pedals. There has been some improvement in performance using this technique; yet, because of the complexities of "un-round" sprockets, and the need for special chain-handling techniques to deal with it, this method has never been wide spread. This problem is exacerbated by the fact that ten to twenty ratios are still required to meet the needs of running on various terrains. As with most other bicycles built today, they utilize a shifting mechanism with a "derailleur" system to meet those requirements.

More recently, U.S. Pat. No. 5,035,678 issued to M. D. Hageman discloses an "Energy-Storing Bicycle Sprocket Drive System". This device helps to improve the efficiency of a chain and sprocket type bicycle drive system by using a set of springs to add torque to the point of minimum applied leverage. However, it would be advantageous to have a vehicle that is not constrained by the requirements of using chains, sprockets, idlers, derailleurs, etc., with their associated penalties of added weight, maintenance, and safety concerns.

Over much of the last century, many people have also worked to change the position that a bicycle rider sits while pedaling. For instances, they are many "recumbents" on the market today. These recumbents let the rider sit in a reclining riding position; rather than the more common upright position used for most bicycles. This configuration gives a much lower wind resistance; and, to most riders, a more comfortable riding position. While offering certain advantages, the recumbents still have the same limitations of requiring the use of multiple sprockets and the associated gear changing mechanism. In addition, they have even longer chains; which adds both weight and complexity to the recumbents.

Most bicycle racers now have the rider's feet tied to the pedals so that they can pull up on one pedal, as they push on the other. This technique also lets one add energy during the minimum energy portion of a cycle, i.e., at the two vertical positions of the pedal stroke. This has helped to increase overall mechanical efficiency of human-power. Yet, at the same time, because the rider's feet are indeed tied to the pedals, it also adds a level of danger; especially, during slow speed operating and when stopping.

Similar efforts have been made with regard to watercraft. Since the mid-1980's, people have experimented with hydrofoils on human-powered watercrafts. For example, Allan V. Abbott, riding such a craft, called the "Flying Fish II", recorded a record speed of 6 minutes, 39.44 seconds over a 2,000 meter course. This was about 10 seconds faster than the single-person rowing-shell record (reference December 1986"Scientific American"). This craft, as well as other hydrofoil human-powered boat (hereinafter referred to "human powered boats"), exhibited several problems which limited their use to extremely well-conditioned athletes. First, the amount of power required to get the hydrofoil human-powered boat up on plane took about 1.5 HP for about 3 seconds. This level of power takes a very well-conditioned athlete to produce, even for that short period of time. Second, because of the cyclical motion of the bicycle type power-transmission, there were losses in the thrust from the propeller. The above mentioned Abbott estimated this loss to be from 2% to 5% of the total. Third, the stability of the hydrofoil was quite poor.

Since the turn of the $20^{th}$ century, people have also tried to develop aircraft to accomplish human-powered flight. During the late 1970's and early 1980's, several very successful human-powered airplanes were demonstrated. This included the "Gossamer Condor", the "Gossamer Albatross", and the "Monarch B", each winning various "Kramer awards" (prizes set up by Henry Kramer, a British industrialist; reference November 1985"Scientific American"). All of these crafts exhibited similar problems to the aforementioned hydrofoils and human powered boats.

The "Monarch B" was successful with one problem: that of energy storage. This craft utilized a separate electric generator with a number of NiCd batteries for energy storage, along with an electric motor that drives a huge propeller, in parallel to the chain and sprocket system that drives that propeller. This composite drive system did the job to win the Kramer Prize; yet, again, required an extremely well-conditioned athlete to accomplish this feat.

By utilizing the present invention, all of the aforementioned limitations can be eliminated. Only wires (which can be quite flexible and easily routed) are required to transmit power from the generator to the energy storage device; and then from the energy storage device to the output motor (or in the case of human powered boats, two motors are used in the preferred embodiment). Thus, the rider can be in sitting in the most effective position (which may vary from person to person). In addition, the frame of the vehicle (whether using two, three, or four wheels, on a wheeled vehicle) can be designated with a maximum strength to weight ratio, while minimizing wind resistance and maximizing overall efficiency, without being constrained by the placement of chains, multiple sprockets, and complex derailleur systems.

The use of harmonic drives to get efficient, high gear increasing ratios has been well known for decades. For instance, a leading supplier of harmonic drives has informed the inventor that harmonic drives have been used by the United States military for hand driven electric generators for use with radio communications since the 1960's. However, by using highly efficient, switched reluctance, or rare earth magnet generators, coupled with the profiling disclosed later in this document, as part of this invention, the overall efficiency of such a device would be significantly improved. For at least a decade, the high efficiencies of such switched reluctance motors and generators have been well known. For instance, the motors used to drive the feed roll on rotary plotters have used switched reluctance motors to drive such feed rollers. Since such feed rollers are typically made of plastic, and thus have no good way to dissipate the heat from the motors, they typically require motors with efficiencies greater than ninety-six percent (96%), to minimize the heat build-up in the first place. The switched reluctance motors proved to be extremely reliable in these applications, largely due to their high efficiencies. Likewise, as disclosed in the September 1998 issue of *Aerospace Engineering*, because of their high efficiencies, switched reluctance motors and generators are effectively used in the direct drive motors and generators that are part of a gas turbine integrated power unit used in military aircraft. In addition, since the early 1990's, rare earth magnets (e.g., the neodimium) motors have been commercially available with efficiencies in excess of ninety-six percent (96%). These motors are now used in numerous industrial applications where performance is the major criteria, largely in brushless servo drives. Again, as with the switched reluctance motors, the major requirements were for high performance and reliability, which mandated high efficiencies to eliminate the need for large cooling fans and heat sinks, previously required by similar applications when using less efficient motors.

By significantly increasing the overall efficiency of the drive system and energy storage device, the present invention enables an "average" human to accomplish similar feats as the above-mentioned Monarch B and Flying Fish II, while enabling the crafts to be much more rugged, and significantly less costly to manufacture. Thus, such products can be manufactured for the consumer market, not just utilized as scientific experiments.

The advantages of external power input to assist human-power has been well known for over a century. Many people have offered for public sale vehicles that had battery assistance, as well as those with various configurations utilizing internal-combustion engines. One kind of wheeled vehicle, typically called a "Moped", uses an internal-combustion engine or electric motor to supply the majority of power; yet, offers a separate drive system to allow the operator to add additional power. To my knowledge, all of these vehicles used a separate drive mechanism for the human-powered, power input and the external energy supply.

For example, in U.S. Pat. No. 5,489,002, Glenn C. Streiff discloses a "solar-powered two-wheel vehicle with energy intensifying solar collector", which also utilizes a pair of rechargeable batteries to supply external power. The Streiff patent again discloses the use of chains and sprockets for both the pedal and the motor/generator system; and because it only had two wheels, vehicles using this concept will not be able to add energy, when the vehicle is stopped. Likewise, when using the motor/generator for "regenerative braking", that purpose will be defeated, if the operator tries to add energy to the system during times when the regenerative braking is taking place. The present invention is meant to remedy both of these limitations.

SUMMARY OF THE INVENTION

It is therefore an objective of the present invention to provide a human-powered or human power assisted energy generation and transmission system with a means for generating power, and a means for storing at least a portion of that generated power for later use.

It is another objective of the present invention to provide such a system for use on a vehicle.

It is an objective of the present invention to provide a human-powered vehicle with a means for generating such power not only through conventional pedal, chain, and sprocket drives, but through other human motions as well.

It is still another objective of the present invention to provide a human-powered vehicle with highly efficient drivetrains to eliminate, or substantially reduce, wasted energy and funnel substantially all generated energy either to locomotion of the vehicle, or into the aforementioned energy storage means.

It is still another objective of the present invention to provide an energy dispersing means wherein power which is stored in the energy storage means is controllably released to facilitate human operation of the vehicle. In other words, the stored energy can be released in such a manner to give constant power to the output means, unlike the normal pedal system using chains and sprockets.

It is another objective of the present invention to provide constant power output over a pedal cycle, despite fluctuations in the instantaneous power input to thereby offer increased efficiency in vehicles due to the fact that there is no "chain stretch" or change in drive force to the vehicle.

It is still another objective of the present invention to provide a human-powered energy generation and transmission system for use on a vehicle which can be used to provide auxiliary electric power for such things as lighting, heating, pumping, etc.

It is still another objective of the present invention to provide a vehicle with operator incentive to maintain a constant pedaling cadence to thus achieve maximum efficiency.

In accordance with these objectives, it is a feature of a preferred embodiment of the present invention to provide a human-powered vehicle which employs an energy storage means in the form of an ultracapacitor which stores energy generated through motion of the human operator for later usage at critical points during locomotion.

It is another feature of the present invention to provide the aforementioned human-powered vehicle which further employs an energy dispersing means which includes an intelligent controller which profiles the motion of the human operator and disperses energy during the times when additional energy is most required. For example, if the energy generation means includes a typical bicycle pedal type arrangement, the human operator will be able to exert maximum power when the pedal is in a forward horizontal position. After another ninety degrees of rotation, the pedals and crank arms will be in a vertical position, corresponding to minimum power output. Therefore, it makes for a more efficient machine if the stored energy is released when the pedal is at its top vertical position of rotation, and is proportionally cut back until a point where no additional energy is released from the storage means, which point will correspond to the forward horizontal point of rotation of the pedal. After passing through the horizontal position, the energy storage means would again begin to increase energy output until again reaching a maximum level when the pedal is at its bottom, vertical position. It should be understood that the bottom, vertical position of one pedal corresponds to top, vertical position of the other pedal.

It is another feature of one embodiment of the present invention to provide energy generation means in the form of a rowing machine wherein the entire body is generating energy. The arms perform a back and forth rowing motion, while the legs squat and contract as the person seated on the machine moves linearly back and forth on a seat provided on rails. The energy generated by the hand motion as well as the linear motion of the seat can be used to generate power. This power can be partially used to move the vehicle and when desired can be partially funneled into an energy storage means for later usage.

It is still another feature of the present invention to provide the aforementioned human-powered vehicle which uses a highly efficient motor such that when energy is released from the energy storage means, it is entirely contributing to the drivetrain and locomotion of the vehicle.

The present invention accomplishes an increase to the overall efficiency by the following means:

First, by using extremely light weight generators and motors (e.g.—generators using rare earth magnets and switched reluctance motors, respectively; both brushless devices offering efficiencies upwards of 94%; while, offering extremely high reliability), the overall energy transfer can be more efficiently accomplished.

Second, by using an extremely efficient energy storage device (e.g.—an ultracapacitor), the energy storage efficiency can be significantly improved. These aforementioned ultracapacitors offer the following advantages over NiCd batteries: no memory effect; high efficiencies, even at high discharge and recharge rates; and extremely long cycle life, with little or no degradation over time. Thin-metal film batteries offer most of same advantages of ultracapacitors, while being more cost effective for recreational type vehicles at the present time.

Third, by profiling the load on the operator of the present invention to compensate for the inherently cyclical change in applied leverage of the typical pedal motion of a bicycle type drive system, the maximum energy output efficiency can be accomplished. The input controller (mentioned, immediately below) would dole out power to the energy storage device by effectively changing the load on the above-mentioned generator to maximize the overall efficiency.

Fourth, by utilizing extremely efficient, light weight, input controllers (controlling the power input to the energy storage device, as well as output controllers controlling the power output from the energy storage device), the present invention offers power transfer efficiencies upwards of 95%. A preferred embodiment of the present invention accomplishes this high efficiency using PWM (Pulse Width Modulation), coupled with the use of MOSFETs (Metal Oxide Semiconductor, Field Effect Transistors) or IGBTs (Isolated Gate Bipolar Transistors), whichever is most appropriate for the currents and voltages involved in a specific application. Alternative switching techniques and devices are possible.

Fifth, by using direct-drive motors and generators, the need for large, heavy, and inefficient gear reducers and increasers can be eliminated. By using motors with rare earth magnets (e.g. Neodymium), or switched reluctance motors, one can manufacture generators that have a sufficient number of poles so that these generators can operate directly at the input speed of the human-powered input to thereby eliminate the need for large ratio gear increasers that would otherwise be required. This would enable the generators to be built directly into the drive hub of the typical pedal mechanism.

By profiling the human-power energy output via an input controller, the present invention raises the overall output efficiencies of human-powered input. Unlike a bicycle type pedal system, that has maximum input power only when the pedal is in the horizontal position, the present invention can set the power output level to the most efficient level. Thus, when the pedal is at the vertical position of its stroke, the power output would be a minimum level; while, at a point ninety degrees later, the power output would be at its maximum (set) level. By monitoring the rotary position of the pedals (or alternative human-power input devices), the load on the generator can be continuously adjusted to maximize overall output efficiencies.

In the preferred embodiment both the generator(s) (for human-power input), as well as the output motor(s) would both be of high efficiency direct-drive types using rare earth magnets (e.g. Neodymium), and switched reluctance technology (to achieve efficiencies in excess of 94%; and power densities of approximately one horsepower per pound). Furthermore, both the input controller, as well as the output controller, would preferably use PWM (Pulse Width Modulation) or other switching techniques using MOSFETS or IGBTs to maximize the efficiency (to upwards of 98%) of the transfer of energy in both devices.

Using PWM techniques, the energy from the generator would be transferred into the energy storage device at a rate determined by the duty cycle of the PWM signal. For example, if the power output was set for a low level, the pulse width might be set for 15% duty cycle; and a high output level might be set for 75% duty cycle. Likewise, the output controller would utilize a PWM system that would contain a flywheel diode around the motor to utilize the inductive reactance of the motor to maintain the current in the drive motor during the off cycle of the PWM signal. The flywheel diode would be switched in and out for a wheeled vehicle, that would utilize regenerative braking.

When used with an ultracapacitor as an energy storage means, the output controller would automatically adjust the duty cycle of the output to compensate for a variation in ultracapacitor voltage level. Thus, if the voltage of the ultracapacitor was at 10 volts, a 50% duty cycle may be required to give the same power level of a 25% duty cycle when the ultracapacitor is at 20 volts. In a similar fashion, the input controller would be able to use the reverse technique to maintain the desired output level from the human-powered generator.

In addition, by utilizing the same energy storage device and power output device to drive a vehicle, using the present invention, external energy can be added to the system with little increase in hardware, complexity, or weight. For example, a human-powered boat, could use a solar cell to augment the human power. By utilizing the same energy storage device and output power device, the increase in weight or complexity of the system will be minimal. Likewise, an efficient motor-generator (whether driven by a gasoline, diesel, or other engine) system could be added to a human-powered boat to either increase performance and/or range of the vehicle. Again, utilizing the same output drive device and energy storage device, the added complexity would be minimal. Thus, a virtually zero pollution vehicle can be made.

By inputting energy into the energy storage device when the present invention is in neutral, a sufficient amount of energy can be stored (over a length of time) to enable a human-powered boat to get up on plane without the high power output that would normally be required to do so, solely from human power. Whether the human-powered boat utilizes hydrofoils or a highly efficient planing hull or ski, this invention enables virtually anyone to store enough energy to get it up on plane. It may take a longer time for an out-of-shape person to store that energy (say 5 minutes, rather than thirty seconds for a highly conditioned athlete) but, once sufficient energy has been stored, the human-powered boat can be designed so that the power required for keeping it up on plane is low enough that virtually anyone can keep it up on plane.

During the various demonstrations of hydrofoil human-powered boat, it was observed that stability was extremely tenuous. That is to say, it was difficult to keep the hydrofoil human-powered boat in the most effective position in the water. In U.S. Pat. No. 4,711,195, Sidney G. Shutt discloses an apparatus to help to deal with this problem. This so called "Shutt strut" helped to reduce this problem.

In the preferred embodiment for a hydrofoil human-powered boat, the hydrofoils utilize "rear-loaded hydrofoils", with a system to adjust the configuration of the hydrofoils (to maximize lift during "take-off"; while, minimizing drag, once the human-powered boat is up on plane; by using a similar technique employed on the flaps of large, commercial aircraft), along with elevator-type adjust devices to stabilize the attitude of the craft.

The use of the aforementioned rear-loaded airfoils (or, in the human-powered boat embodiment, hydrofoils) are well known for their use on sailplanes; and have been utilized on certain third-generation human-powered aircraft (reference the German "Musculair" mentioned in the November, 1985 issue of "Scientific American"). It is well known, to those well versed in the area of aerodynamics, that rear-loaded airfoils offer large lift-to-drag ratios (important for getting a hydrofoil human-powered boat up on plane) that prevail through a wide range of speeds and angles of attack. Thus, rearloaded hydrofoils enable one to make a human-powered boat that is more suitable to varying load and speed conditions, than those presently available.

Again, in the preferred embodiment of a human-powered boat, the shape of the hydrofoil is mechanically adjustable in a manner similar to that used to adjust the flaps on large commercial aircraft. This feature offers two advantages: first, the human-powered boat would come up on plane at a reduced speed and energy expenditure; and second, the hydrofoil could be tuned to varying conditions of power input and load. Thus, a well-conditioned athlete would be able to tune the hydrofoil for minimum drag to achieve maximum speed; while the same human-powered boat would be acceptable for a family to cruise, at a much slower speed. Yet, the human-powered boat would still be operating on plane in both instances; and, thus, requiring much less power than a similar human-powered boat without these features.

Again, in the preferred embodiment, of a hydrofoil human-powered boat using the present invention, stability is accomplished with the use of adjustable winglets. That is to say, small adjustable surfaces are adjusted automatically, using skis that are mounted in front of the human-powered boat to sense the level of the water, and adjust that level so that the hydrofoils are always in the water; and yet, are just below the surface of the water, minimizing the drag of the struts that secure the hydrofoils to the human-powered boat.

Again, in the preferred embodiment of the present invention in a human-powered boat, a water jet (or ducted propeller) is utilized to force water over its hydrofoils, to fool the hydrofoils to come up on plane sooner than would be required by the speed of the hull without this feature. When using this feature, with the increased efficiency (especially, at zero speed) of a ducted propeller, the human-powered boat would come up on plane at much reduced energy and power levels.

Using the present invention in a wheeled vehicle, it is possible to significantly increase the level of stored energy when going down hill via both regenerative braking, as well as by pedaling in neutral. If the vehicle is a bicycle and stopped, the operator could continue to pedal while in neutral to store energy, and a kickstand or the like would be provided to facilitate this motion. Thus, when an uphill section occurs, sufficient energy would have been stored to enable the operator to ascend that hill at a much greater speed, while continuing to supply pedal power at a constant level.

In an alternative embodiment of the present invention, it would be possible to set both a pedaling cadence, and a power level through an electronic control. Thus, it will be possible to set a cadence of, for example, sixty strokes per minute. At a cadence below sixty, the load would be reduced; while, at a cadence above sixty, the load would increase. The operator would be able to adjust both the cadence and the associated load, at will.

Another embodiment of this invention uses an energy meter that can measure and display: instantaneous power input and output; energy stored, within a band to indicate that sufficient energy is available to get a human-powered boat up on plane, etc.; total energy input (from human-power, over a period of time); and distances covered (or time spent) or distance able to go with present stored energy level. Thus, it would be possible to display a speed and distance available for going up a given incline road with a human-powered wheeled vehicle; or the distance available at a given speed with a human-powered boat. This meter could also display: cadence (actual, as well as desired), power (or load—both actual, as well as power being generated), etc.

The present invention can utilize foot and/or arm and/or other body motion to efficiently generate power. The present invention would use an efficient electrical generating means, which may include an efficient gear increasing means (e.g.—a planetary gear or harmonic drive); a power input means to change linear motion into rotary motion (the present invention can also be utilized with a linear generating means directly, as well); an electronic control means which will sense position of the power input to optimize the power output of the human power input; and an energy storage means that will both store power as well as act as a flywheel to any electrical output operated by the present invention.

Unlike a mechanical bicycle type pedal mechanism, which achieves maximum power transfer only when the pedal is horizontal, the input controller of the present invention will be able to modulate the load to increase the efficiency of the human body input. If a foot pedal type mechanism is utilized as a human power input means to the present invention, the effective load can be modulated by the electronic control means to optimize the power input and, hence, the power output.

If a rowing machine type energy input means is used in the present invention, power can be effectively generated by both the arm type rowing motion, as well as by the motion of the sliding seat, typically used in a racing scull. Thus, one can now row in the right direction (being able to see where they are going—without looking over their shoulder)—a significant safety feature for any rowing type human-powered boat.

By utilizing a one-way clutching means on both oars of the rowing mechanism and a generating means coupled to the rotation of the rotating portion of oars, the power output from the oars can be modulated by an electronic control means to maximize the power input (and, hence, the human-power output to the energy storage means) from the human body movement. In addition, a linear to rotary motion input means can generate power from the motion of the sliding seat of the rowing mechanism. The sliding seat can have a rack and pinion (or other device), with the pinion on one side driving a generating means to generate power in one direction; and a second pinion driving a generating means in the opposite direction. The generator could utilize a pinion could drive into a one-way clutch to obtain power in only one direction, if so desired. Linear motor could be used as a generator.

In an alternative embodiment, the seat could be stationary and the backward stroke of the oars would move a foot rest. Thus, energy could be captured on both directions of the strokes of the oars, as well as from the movement of the foot rest. With this embodiment, the transfer of momentum from the movement of one's body can be minimized; thus, offering increased efficiency in human-powered boats. As with other embodiments, the input controller could be set to profile the power output for maximum overall efficiency.

As with all human-powered vehicles, all aspects of the present invention and associated hardware for any human-powered (or assisted) vehicle, weight, and friction (whether, by rotating mechanisms or by induced air or water drag), must be kept to a minimum. The overall efficiency must be carefully evaluated for each component, as well as the overall system; while keeping in mind the practical cost/performance limitations for any vehicle sold to the consumer market. For example, all efforts must be made to reduce drag and friction by using, for example, Teflon surfaces for bearings, etc.; and aerodynamically clean bodies to reduce both air and water drag (on human-powered boat).

In addition, the preferred human-powered boat utilizes the dimple tape disclosed in U.S. Pat. No. 5,540,406 by Anthony c. Occhipini to significantly improve the lift/drag of the hydrofoils on our hydrofoil human-powered boat. Said dimple tape is also used to reduce drag on all other surfaces that come in contact with the water on all human-powered boat, again, in the ways disclosed by the Occhipini patent.

These and other objectives and advantages of the invention, will become more apparent from the following detailed description when taken in conjunction with the accompanying drawings.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 1:
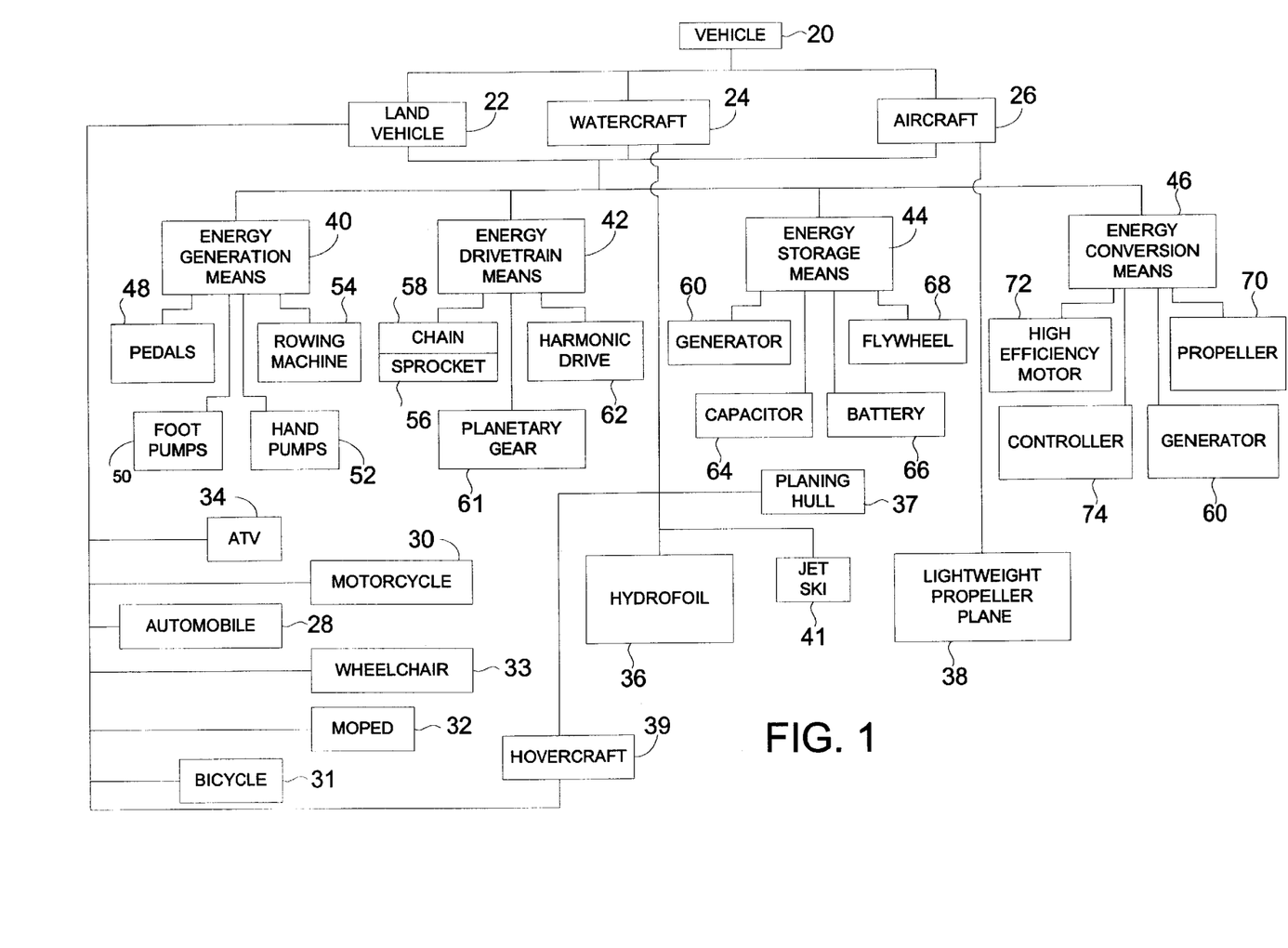
FIG. 1 is a schematic overview of the preferred embodiment of the present invention.

Referring now to the drawings, FIG. 1 depicts the preferred embodiment of the present invention in schematic fashion and generally refers to human-powered vehicle 20. However, the present invention need not be used with vehicles 20, in that energy generation means 40, energy drivetrain means 42, energy storage means 44, and energy conversion means 46 could be used in conjunction with any electrically actuated device. As shown in FIG. 1, human-powered vehicle 20 includes practically any conceivable type of vehicle for transporting individuals or cargo, including land vehicles 22, water craft 24, and aircraft 26. By way of example only, it is currently conceived that land vehicles 22 can include automobiles 28, motorcycles 30, bicycles 31, mopeds 32, wheelchairs 33, and all terrain vehicles (ATV) 34. Similarly, water craft 24 and aircraft 26 can include any particular type of vehicle falling under such categories, including hydrofoils 36, planing hulls 37, jet skis 41, and propeller planes 38, respectively, or a hybrid such as hovercraft 39.

It can therefore be seen that vehicle 20 can include a wide variety of actual vehicle types. However, each vehicle encompassed by the present invention would include the same basic technology which would include energy generation means 40, and energy drivetrain means 42, and energy storage means 44, and an energy conversion means 46. In using the aforementioned elements, the present invention is able to operate extremely efficiently and use a portion of the energy generated by the operator for actual locomotion, and a portion of the energy for charging the energy storage means 44 for later use. Moreover, through the energy drivetrain 42, vehicle 20 is made more efficient in that less energy is needed to overcome the internal resistance of the drivetrain components, and thus more energy can be used either for storage or actual propulsion of the vehicle. Finally, through the novel features of the energy conversion means 46, the energy released by the energy storage means 44 can be released in a controlled and structured manner to most efficiently profile the energy needs of the vehicle operator. Such a system will therefore ensure that energy is released when it is most required and not wasted when the human operator is able to efficiently power the vehicle. Each of these elements will be discussed in greater detail herein.

With regard to the energy generation means, human-powered vehicle 20 of the present invention is designed to be powered by any number of mechanical apparatus which are adapted to convert human motion into energy for storage purposes, or for conversion to the propulsion means of the vehicle. For example, one embodiment of the present invention would use a typical bicycle type mechanism wherein a pair of pedals 48 would be attached to arms mounted to a rotatable hub. The human operator would therefore exert energy to cause the pedals to rotate, with such rotational energy then being carried by the energy drivetrain means 42 to either charge the energy storage means 44, or propel the vehicle through energy conversion means 46.

In an alternative embodiment, pedals 48 need not be used. Rather, a pair of foot pumps 50 or hand pumps 52 could be employed. Foot pumps 50 and hand pumps 52 are commonly used in modem exercise equipment such as in step climbers, nordic skiing machines, and in stationary bicycles. More specifically, the human operator causes the foot pumps 50 or hand pumps 52 to operate individually in a back and forth motion. Again, such motion could then be used to drive energy drivetrain means 42 for the aforementioned reasons. In a still further embodiment, energy generation means 40 could be provided in the form of a rowing machine 54 wherein the operator would be situated on a slideable seat. The seat would be adapted to move back and forth in a linear motion as the legs of the operator extend and contract. Simultaneous with this linear motion, the arms of the operator would perform a rowing motion wherein a pair of cables or other suitable actuators would be pulled against resistance to thereby generate energy. Again, such generated energy could be used to drive energy drivetrain means 42 and thus power energy storage means 44 or energy conversion means 46.

While a number of specific embodiments have been disclosed in this application, it is to be understood that energy generation means 40 is defined as any structure which is adapted to be driven by human power. Combinations of the aforementioned mechanical apparatus are certainly possible.

Turning now to the energy drivetrain means 42, the present invention again encompasses a number of different embodiments. For example, the aforementioned pedals 48, foot pumps 50, hand pumps 52, and rowing machine 54 could all be used to cause a sprocket 56 to rotate and thus cause a chain 58 trained to the sprocket to move in an endless loop. This rotational energy could be used to drive a generator 60 of energy storage means 44 or could be used to provide propulsion to the vehicle. It is to be understood that a number of differently sized sprockets 56 could be provided to provide a different number of gears providing greater or lesser resistance to the human operator.

In another embodiment of the present invention, a harmonic drive 62 could be employed which would thus have an extremely high gear ratio on the order of 100 to 1, or more. Thus, relatively little rotation or motion on the part of the human operator could cause a correspondingly high RPM in the output of the harmonic drive for either charging energy storage means 44, or for propelling the vehicle through energy conversion means 46. In a still further embodiment a planetary gear system 61 could be used.

In another preferred embodiment drivetrain means 42 can be connected to direct drive generator 60 to eliminate the need for gear increasers. Likewise a direct drive motor 72 can be used to directly drive the wheels of the vehicle 20. Such direct-drive motors and generators have a running speed largely dependent on the number of poles therein. By using ones with rare earth magnets (e.g. Neodymium) or "switched" reluctance motors, one can manufacture generators that have a sufficient number of poles so that these generators can operate directly at the input speed of human-power input (typically 60–120 RPM on a bicycle), thus eliminating the need for large ratio gear increasers.

Once energy has been created through energy generation means 40 and converted into rotational output energy through energy drivetrain means 42, the created energy can either be stored in energy storage means 44, or used to propel the vehicle through energy conversion means 46. First, with regard to energy storage means 44, it is to be understood that the output of energy drivetrain means 42 is connected to generator 60 to drive generator 60 and thus create rotational energy. This rotational energy could be used to charge ultra-capacitor 64 or battery 66, or could be used to impart motion to flywheel 68. The energy stored in ultra-capacitor 64, battery 66, or flywheel 68 could then be drawn upon at a later time when additional boost energy is required, as will be more specifically described below. In another embodiment, the flywheel 68 could have a built-in motor/generator as referenced in the October 1996 issue of *Discover* magazine.

In one embodiment of the present invention, the entire bundle of energy created by the human operator could be used to charge energy storage means 44 and thus leave vehicle 20 stationary. In an alternative embodiment, the energy storage means 40 could remain dormant and the entire bundle of energy created by the human operator could be used to propel the vehicle. In still another embodiment, portions of the energy created could charge the energy storage means 44, while the remaining portion could be used for propulsion of the vehicle. One of ordinary skill in the art will also readily recognize that more than one energy generation means 40 can be used to power the same vehicle, for example, with a tandem bicycle.

With regard to the actual manner in which the vehicle 20 could be propelled, again a number of different embodiments are encompassed in this invention. In a first embodiment of the present invention, the energy created by the human operator could be directed through energy drivetrain means 42 and directly to the propeller 70 of vehicle 20. In describing propeller 70, the present invention is including the connection of energy drivetrain means 42 to an axle or wheel of a land vehicle, or a water or air displacing propeller. However, when the energy storage means 44 is drawn upon to partially or completely propel vehicle 20, a motor 72 will need to be provided to transform the stored electrical energy in ultra-capacitor 64 or battery 66 into rotational mechanical energy. This rotational mechanical energy would then in turn be used to power the wheels or propeller of the vehicle. A separate motor could be used for each wheel or propeller of the vehicle.

Again with an eye toward efficiency, the present invention uses a high efficiency motor having a relative light weight. This ensures that the maximum amount of energy is being used for propulsion of the vehicle as opposed to overcoming the internal mechanical resistance of the motor. The overall weight of the vehicle 20 is also kept as low as possible. In a preferred embodiment, the present invention employs a rare earth magnet motor, which as described above can be used to directly drive the propeller or wheel.

Figure 2:
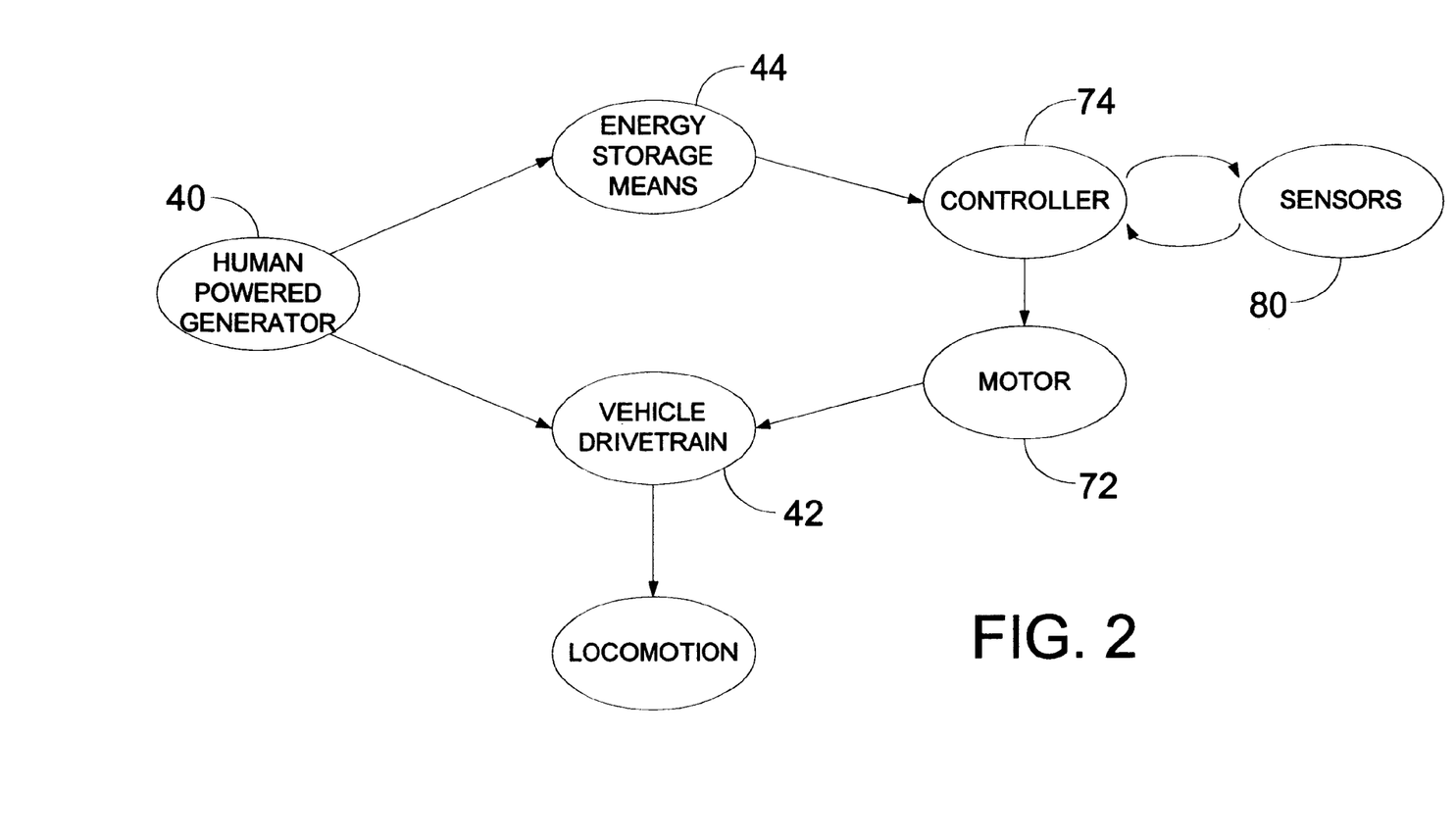
FIG. 2 is a schematic representation of the mode of operation of the preferred embodiment of the present invention.
Figure 3:
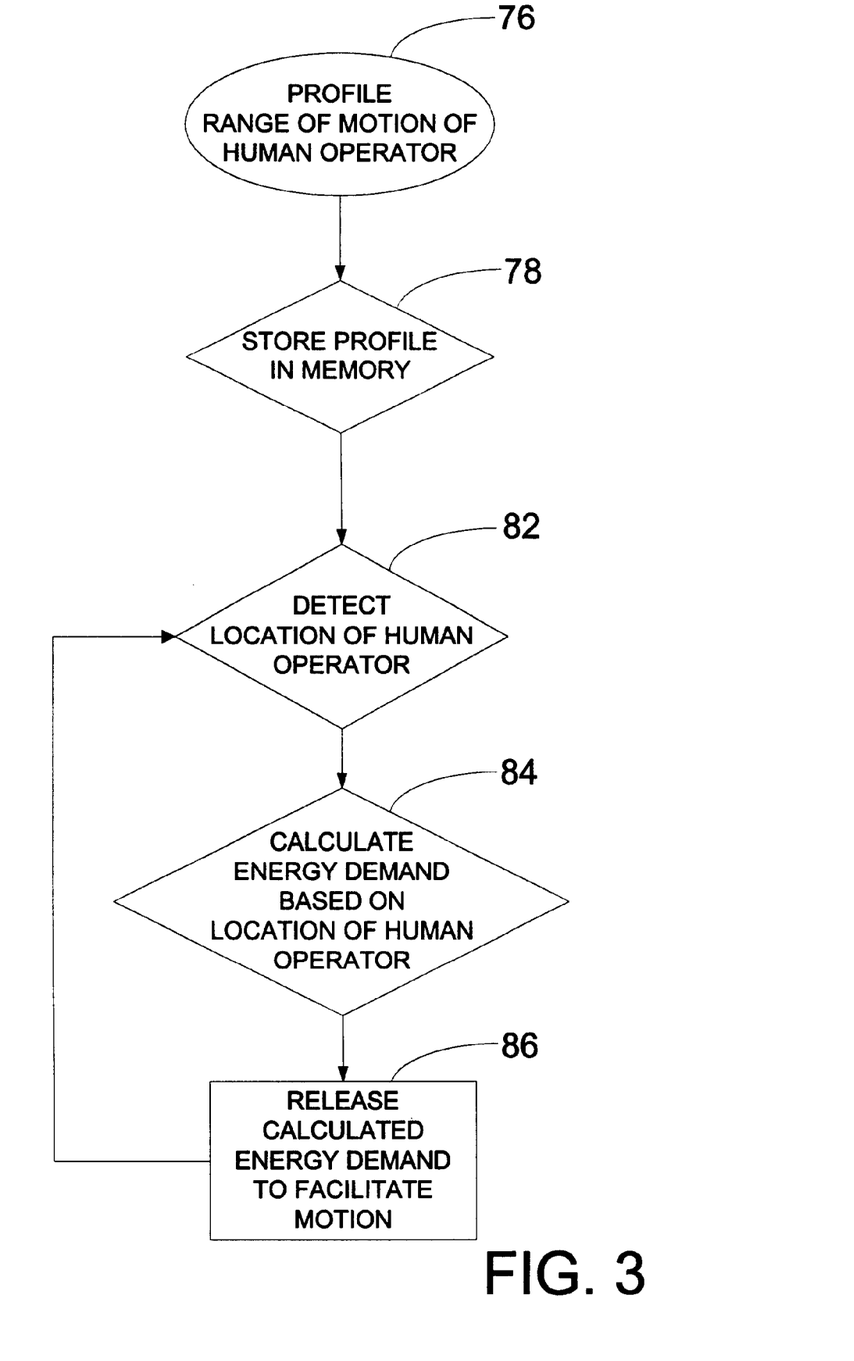
FIG. 3 is a flow chart depicting the logic followed by the controller used in the preferred embodiment of the present invention.

In conjunction with energy conversion means 46, the present invention provides a novel manner in which the energy from energy storage means 44 can most efficiently be distributed for propulsion of the vehicle. Turning now to FIGS. 2 and 3, it can been seen that energy conversion means 46 also preferably includes a microprocessor based controller 74. Controller 74 is used to calculate the amount of energy which should be released during actual operation of vehicle 20 to ensure that energy is only released when it is required and is not wasted when the human operator is fully able to generate sufficient power.

For example, with regard to the bicycle pedal 48 arrangement previously discussed, one of ordinary skill in the art will clearly recognize that during rotation of pedals 48, the human operator is able to generate the maximum amount of power when the pedal is at its forward horizontal position. As the operator continues to move the pedal rotationally downward, less and less power is generated by the operator until reaching the bottom vertical position where the minimum amount of power is generated. At this bottom vertical point, the opposite pedal is at its top, vertical position. It would therefore be advantageous if the energy storage means 44 were controlled to dispense power at the time when the pedals are vertically disposed and then proportionally decrease the power released until reaching a minimum level when the pedals are horizontal and the operator is thus generating maximum power. After passing the horizontal position, power output of storage means 44 increases as power output of the operator decreases. It can therefore be seen the power output of storage means 44 would reflect a cyclical pattern, which can be profiled using a suitable control algorithm. This profile could be tailored to the individual operator as well.

The present invention accomplishes this by providing controller 74 which can be programmed to sense the actual position of the pedals, and thus release maximum power when the pedals are vertically disposed and minimum power when the pedals are horizontally disposed. Similarly, when energy generation means 40 are provided in the form of the aforementioned foot pumps 50, hand pumps 52, or rowing machine 54, controller 74 can be programmed to sense the actual positions of the mechanical components and release energy when maximum power is required. Since the positions of minimum and maximum power may vary from operator to operator with different positions, these positions can be adjustably programmed into controller 74.

FIG. 3 provides an example of the program logic which controller 74 could employ for releasing energy from energy storage means 44. As shown therein, step 76 requires programming of the controller 74 to store the range of motion of the human operator in memory 78 of controller 74. Profiling step 76 further entails releasing maximum energy from energy storage means 44 at the pertinent positions during actual operation of energy generation means 40.

During actual operation of human vehicle 20, the positions of energy generation means 40 are continuously monitored by sensors 80 which in turn direct signals to controller 74 as indicated at step 82. The sensor 80 utilized to give input information on the position of any human-powered input could be in many forms including the following: An encoder (either absolute or incremental with a marking pulse); a resolver; a potentiometer; a Hall effect sensor; or any other rotary or linear position sensor that meets the needs of a position sensing device to achieve the profiling step of the present invention. It will be obvious to those of ordinary skill in the art of designing and programming microprocessor based controls (as well as the most simply analog controls) that once "position" is available as in input to the microprocessor, it is quite possible to profile the load into the energy storage means, via the input controller, in whatever manner is required to obtain the highest overall efficiency. It will also be obvious that riders of any human-powered (or assisted) vehicles may have different riding positions depending on physical size, strength, seating positions, etc. Thus, it would be possible to modify the profiling to suit each particular rider, by modifications of the various parameters used to establish that profiling. This could also be accomplished by a mechanical phasing adjustment. Similarly, a simple analog controller could be used to implement the profiling of position without leaving the scope of the present invention.

Controller 74 would then calculate the energy demand based on the actual sensed location of the energy generation means 40 and compare that to the profile stored in memory 78 of controller 74. As indicated at step 84, controller 74 then calculates the energy to be released and such energy is then released as indicated at step 86.

One of ordinary skill in the art will also readily recognize that the entire energy generation means 40, energy drivetrain means 42 and energy storage means 44 could be manufactured as portable units for interchangeability with various vehicles 20. Thus, the same device could be utilized in both a human powered wheeled vehicle, as well as a human powered watercraft and human-powered aircraft.

Figure 4:
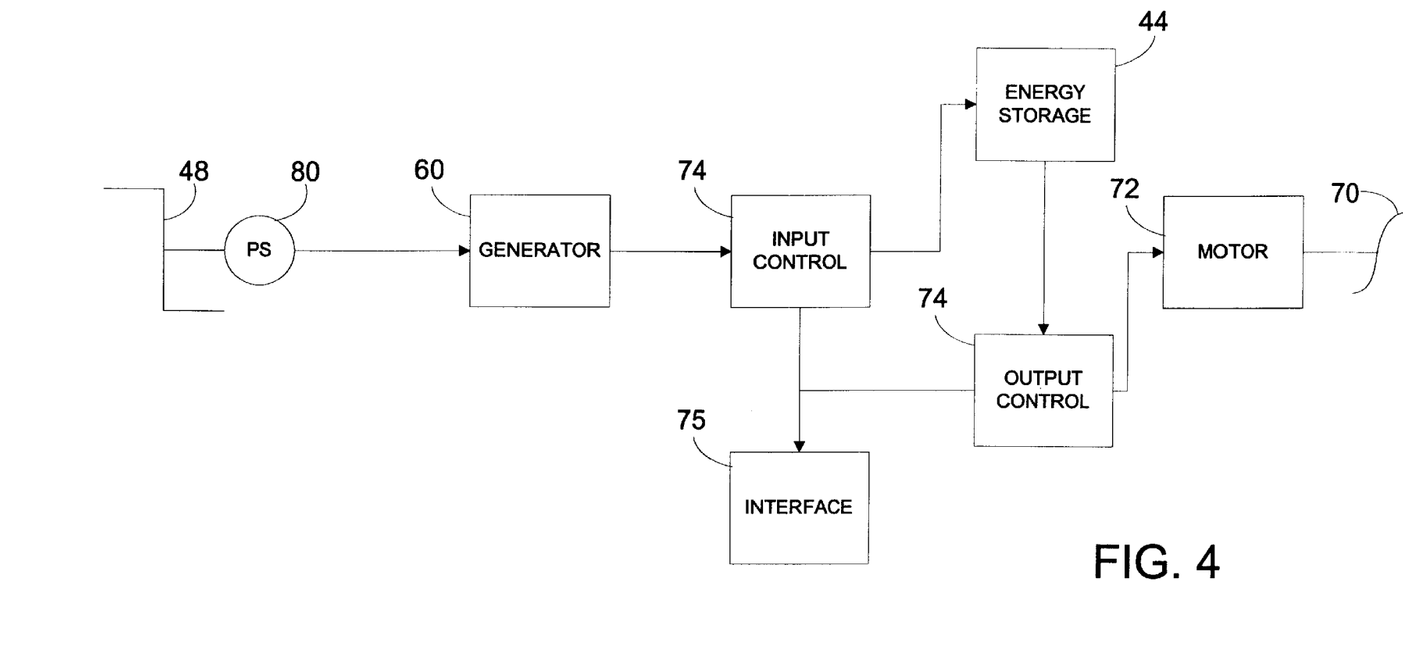
FIG. 4 is a schematic representation of an embodiment of the present invention employing an electronic controller using pulse width modulation technology.

An example of a possible system embodying the present invention, is shown in FIG. 4, wherein an electronic transmission is shown which uses a micro-processor 74 to control the timing and amount of power dispersed from energy storage means 44. The controller 74 includes an interface 75 that displays information to the operator and that allows the operator to set parameters. As described earlier, this is done by receiving signals from position sensors 80 such that controller 74 knows the relative positions of pedals 48. At the time when position sensors 80 indicate to controller 74 that pedals 48 are horizontal, controller 74 will in turn direct energy storage means 44 to release the minimum amount of power therefrom to assist the operator. However, when position sensors 80 indicate that pedals 48 are vertically disposed, and thus the operator is generating minimum of power, controller 74 will in turn direct energy storage means 44 to release maximum power to assist the operator. Controller 74 can use a pulse width modulated or other switching control algorithm to control this cyclical release of power. In other words, as pedals 48 move from the vertical to the horizontal, controller 74 proportionally decreases the amount of power released from energy storage means 44. Conversely, as pedals 48 move from the horizontal to the vertical, controller 74 causes energy storage means 44 to proportionally increase the power released therefrom.

It should therefore be understood by one of ordinary skill in the art that the present invention could be advantageously employed in a human-powered vehicle, or a partially human-powered vehicle, to allow the vehicle to have access to additional boost energy when such energy is most critical. For example, when a land vehicle 22 is traversing a downhill or planar surface, a portion of the generated power can be used to charge energy storage means 44, while a portion of the generated power can be used to actually propel the vehicle. The energy stored in energy storage means 44 could then be called upon when the land vehicle 22 is about to ascend a hill. This would assist the human operator in ascending the hill and in the end result in a longer range for the vehicle in that the energy output required by the human operator would be balanced over time. Moreover, energy can continue to be generated even when the vehicle is stopped by directing all energy to the energy storage means 44. If the vehicle 20 is a bicycle or other two wheeled vehicle, a kick stand or training wheels could be added to facilitate such operation.

Similarly, with the operation of a water craft 24, for example hydrofoil 36, the largest energy demand is required to cause the hydrofoil 36 to elevate out of the water and into a plane formed between the skis of the hydrofoil and the surface of the water. Once the hydrofoil is substantially out of the water, only the propeller 70 remains in the water and thus decreased energy is required to move the hydrofoil due to this reduced drag. However, since such exorbitant amounts of energy are required to cause hydrofoil to attain this reduced drag position, the human operator is often unable to sustain the position of the hydrofoil and thus the overall range of the vehicle is severely limited. However, through the use of the present invention, energy stored in means 44 could be called upon to assist the human operator in elevating the hydrofoil up into the reduced drag plane and the human operator would be more able to sustain motion of the hydrofoil.

Finally, with any human-powered vehicle, efficient use of energy is critical. Not only does the present invention provide a means for storing energy for later usage during critical points of locomotion, but the present invention also uses a microprocessor based controller which allows for efficient distribution of the energy during various positions of human operation. In other words, energy is released when it is most required given the particular generation means employed, and thus relatively little or no energy is released during periods of operation of the generator when little or no energy is required.

Figure 5:
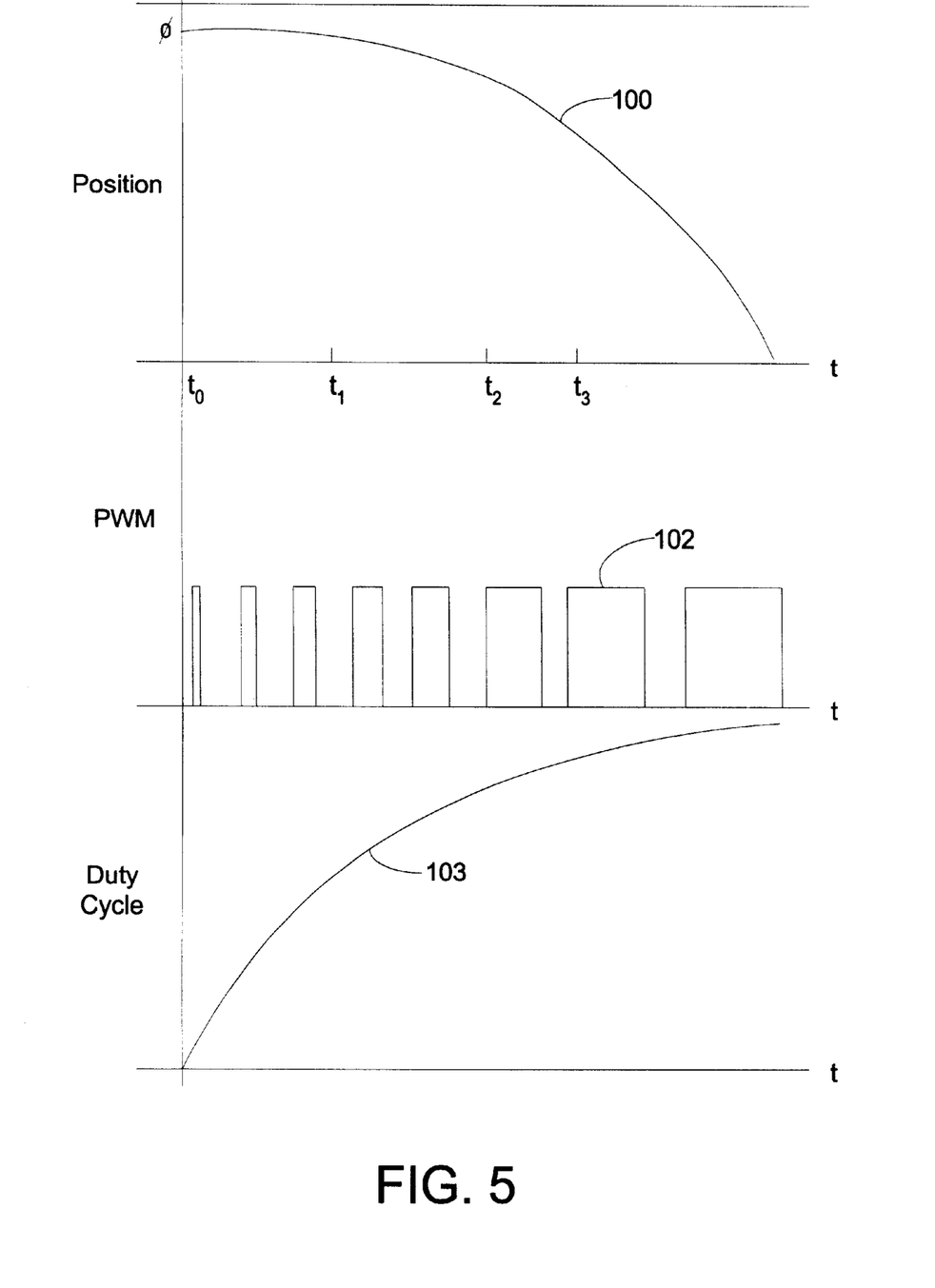
FIG. 5 is a graphical illustration of an embodiment of power profiling in accordance with the teaching of the instant invention.

An embodiment of the power profiling described above may be better understood with reference to FIG. 5. As may be seen from this graphical illustration, as the angular displacement of the human driven element such as a pedal, etc. as described above, transitions through its range of motion as illustrated by curve 100, the energy profiling varies the power extracted in relation to the position based at least in part on the availability of torque to be supplied by the human. Specifically, as the pedal is transitioned from its vertical top position as illustrated at time $t_0$, the controller varies the pulse width during which the generator driven by the pedals are coupled to an electrical load. This electrical load, as described above, may be the energy storage device or the vehicular drive motor depending on the particular implementation. As the pedal position is transitioned from to $t_0$ $t_1$, the human's ability to produce more torque is increased. Therefore, the controller increases the duty cycle of the pulse width modulated connection to the electrical load to utilize this increased availability of torque to generate an increased output from the pedal driven generator. This is illustrated in curve 102 of FIG. 5 which illustrates the pulse width modulation varying as a function of time or angular position of the pedal and hence the ability of the rider to produce power. Curve 103 illustrates this cyclical increasing and decreasing of the duty cycle of the pulse width modulated connection to better illustrate the point. As would be expected, this pulse width modulated connection to an electrical load varies the required torque input to the generator and is profiled to maximize the efficiency of the rider's input to the rider's ability to produce an output. While the duty cycle profile illustrated in curve 103 is generally cyclical, one skilled in the art will recognize that this curve may be profiled differently for different riders based upon their physical abilities to generate torque throughout the positional cycle of the input drive mechanism. For example, riders with physical handicaps such as knee replacements or other prosthesis may be able to generate torque in a much different configuration than that illustrated in FIG. 5. However, the controller of the instant invention allows this rider's specific torque profile to be utilize to optimize the efficiency of the generation of power by tailoring the profile of the pulse width modulated connection of the generator to extract maximum power based on maximum availability of torque, and to minimize the requirement of torque output when the rider is least able to supply it. It will also be apparent to those skilled in the art based upon the proceeding teachings that such a profiling may vary the instantaneous stroke speed versus position of the pedal, allowing a rider to quickly move through the area of least available torque production based upon the virtual disconnection of the electrical generator from an electrical load allowing for a greatly reduced torque required input and therefore a shorter amount of time during the low torque production periods of these cyclical pedal cycle.

What is claimed is:

1. A human-powered energy generation and transmission system, comprising:

an input mechanism adapted to be powered by a human operator for creation of mechanical energy;

an electrical generation mechanism connected to the input mechanism and adapted to convert the mechanical energy into electric energy;

an energy storage mechanism connected to the electrical generation mechanism and adapted to retain the electrical energy converted by the generator;

a position sensing mechanism connected to the human-powered input mechanism to sense position of the human-powered input mechanism;

a controller connected to the electrical generation mechanism, the position sensing mechanism, and the energy storage mechanism, and adapted to control the load on the electrical generation mechanism to maximize human-powered energy output efficiency; and an output mechanism connected to the input mechanism and energy storage mechanism and adapted to control conversion of electrical energy to obtain the desired type and levels of voltage and current.

2. The human-powered energy generation and transmission system of claim 1 wherein the energy storage mechanism is an ultracapacitor.

3. The human-powered energy generation and transmission system of claim 1 wherein the energy storage mechanism is a thin metal film battery.

4. The human-powered energy generation and transmission system of claim 1 wherein the energy storage mechanism is a flywheel with a built-in motor/generator to input and output energy, respectively.

5. The human-powered energy generation and transmission system of claim 1 utilized in a human-powered boat.

6. The human-powered energy generation and transmission system of claim 5 wherein the boat includes planing hulls, the energy storage mechanism being sufficiently large to bring the boat up on plane, and the planing hulls being adapted to maintain the boat on plane with human-powered input and no assistance from the energy storage mechanism.

7. The human-powered energy generation and transmission system of claim 1 further including an operator interface device to display operation information to the human operator.

8. A human-powered vehicle comprising:

a human-powered input mechanism adapted to move between minimum and maximum energy generation positions;

at least one generator connected to the human-powered input mechanism and adapted to convert mechanical energy created by the human-powered input mechanism to electrical energy;

an energy storage means connected to the generator and adapted to store electric energy;

at least one output mechanism connected to the input mechanism and the energy storage means and adapted to provide locomotion to the vehicle; and a controller adapted to release maximum energy from the energy storage means to the output mechanism when the input mechanism is at the minimum energy generation position, and minimum energy when the input mechanism is at the maximum energy generation position.

9. The human-powered vehicle of claim 8 wherein the human-powered input mechanism produces energy along a cyclical profile and the controller releases energy at a rate inverse to the cyclical profile of the input mechanism.

10. The human-powered vehicle of claim 9 wherein each output mechanism includes a motor adapted to convert the electrical energy to mechanical energy to drive wheels of the vehicle.

11. The human-powered vehicle of claim 9 wherein each generator is directly coupled to an input mechanism and each motor is directly coupled to a wheel of the vehicle.

12. A method of powering an at least partially human-powered vehicle comprising the steps of:

profiling the motion of the human operator to determine positions of maximum mechanical advantage and minimum mechanical advantage;

generating mechanical energy through motion of the human operator;

utilizing at least a portion of the mechanical energy to provide locomotion to the vehicle; and releasing energy from a storage source in a controlled manner such that maximum energy is released when the human operator is in a position of minimum mechanical advantage, and minimum energy is released when the human operator is in a position of maximum mechanical advantage.

13. The method of claim 12 further including the step of storing at least a portion of the generated mechanical energy as electrical energy in the storage source.

14. The method of claim 12 further including the step of releasing maximum energy from the storage source when the vehicle is in maximum need of energy.

15. The method of claim 12 wherein the profiling step is performed using a position sensing mechanism.

16. An at least partially powered human vehicle, comprising:

an input adapted to receive human power and generate mechanical energy;

a generator adapted to convert the mechanical energy to electrical energy;

a storage reservoir adapted to store the electrical energy;

an output adapted to utilize the mechanical energy to drive the vehicle and to convert the electrical energy to mechanical energy to drive the vehicle; and a controller adapted to direct maximum energy from the input and the storage reservoir to the output when desired by the operator such that maximum energy is directed from the storage reservoir when a position of the input is at a minimum energy generation position.

17. The vehicle of claim 16 further including an operator interface module in communication with the controller and adapted to display information to the operator as well as allow parameters to be set by the operator.

18. The vehicle of claim 16 wherein the output includes a high efficiency motor and the vehicle includes exterior surfaces with reduced drag to improve the overall efficiency of the vehicle.

19. The vehicle of claim 16 further including means for sensing the position of the human-powered input, and wherein the controller is adapted to profile the motion of the human-powered input and release energy from the storage reservoir based on the position of the human-powered input relative to the profile.

* * * * *